（12）United States Patent
Heo et al.

(10) Patent No.: US 10,994,770 B2
(45) Date of Patent: May 4, 2021

(54) METHOD AND APPARATUS FOR CONTROLLING ANGLE OVERLAY OF VEHICLE ACCORDING TO INPUT STEERING ANGLE SENSOR

(71) Applicant: MANDO CORPORATION, Gyeonggi-do (KR)

(72) Inventors: Hyeon Heo, Gangwon-do (KR); Jong Hyun Pyo, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 251 days.

(21) Appl. No.: 16/147,554

(22) Filed: Sep. 28, 2018

(65) Prior Publication Data
US 2019/0100238 A1 Apr. 4, 2019

(30) Foreign Application Priority Data
Sep. 29, 2017 (KR) .......................... 10-2017-0126946

(51) Int. Cl.
*B62D 5/04* (2006.01)
*B62D 6/00* (2006.01)
(52) U.S. Cl.
CPC .......... *B62D 5/0484* (2013.01); *B62D 5/049* (2013.01); *B62D 6/002* (2013.01)
(58) Field of Classification Search
CPC ....... B62D 5/0484; B62D 6/002; B62D 5/049
See application file for complete search history.

(56) References Cited

U.S. PATENT DOCUMENTS

2016/0200353 A1* 7/2016 Sasaki ................... B62D 5/049
701/43

FOREIGN PATENT DOCUMENTS

| JP | 2006-123663 | 5/2006 |
| JP | 2015-58910 | 3/2015 |
| JP | 2017-77830 | 4/2017 |

OTHER PUBLICATIONS

Office Action dated Nov. 19, 2018 for Korean Patent Application No. 10-2017-0126946 and its English machine translation by Google Translate.

* cited by examiner

*Primary Examiner* — Michael V Kerrigan
(74) *Attorney, Agent, or Firm* — Ladas & Parry, LLP

(57) ABSTRACT

Provided are a vehicle control apparatus and method. A vehicle control apparatus for controlling an angle overlay operation of a vehicle includes a reception unit configured to receive a target steering angle from a target steering angle transmission apparatus, a resetting unit configured to reset an input steering angle sensor when an abnormality has occurred in the input steering angle sensor, and a control unit configured to control the angle overlay operation based on the target steering angle, whether an abnormality has occurred in the input steering angle sensor, and a steering angle received from the input steering angle sensor.

20 Claims, 4 Drawing Sheets

METHOD AND APPARATUS FOR CONTROLLING ANGLE OVERLAY OF VEHICLE ACCORDING TO INPUT STEERING ANGLE SENSOR

CROSS REFERENCE TO RELATED APPLICATION

This application claims priority from Korean Patent Application No. 10-2017-0126946, filed on Sep. 29, 2017, which is hereby incorporated by reference for all purposes as if fully set forth herein.

BACKGROUND OF THE INVENTION

1. Field of the Invention

Exemplary embodiments relate to a vehicle control apparatus and method, and more particularly, to a vehicle control apparatus and method for controlling an angle overlay operation depending on an abnormality in an input steering angle sensor used for angle overlay.

2. Description of the Prior Art

Along with the spread of autonomous driving vehicles, the number of vehicles equipped with an angle overlay function is increasing.

Angle overlay refers to a function of analyzing a steering angle of a vehicle calculated by an input steering angle sensor and a predetermined target steering angle and controlling electric power steering (EPS) of the vehicle such that the steering angle of the vehicle follows the target steering angle while the vehicle is autonomously traveling.

Angle overlay refers to a function of controlling steering such that a vehicle automatically follows a predetermined target steering angle based on information received from an external apparatus (e.g., a camera, a radar, etc.). Angle overlay may be called external angle control (EAC), automatic steering control, or the like, and its meaning is not limited by name.

Generally, a vehicle that performs the angle overlay function calculates the vehicle's steering angle using a relative steering angle sensor of a torque sensor as an input steering angle sensor. In this case, when an abnormality has occurred in the relative steering angle sensor of the torque sensor while the vehicle is traveling, the angle overlay operation is immediately stopped. Accordingly, the vehicle's driver must manually control the vehicle's steering. However, it may be difficult for the driver to quickly and manually control the vehicle's steering because the driver may not hold the steering wheel or may be careless during general autonomous driving.

SUMMARY OF THE INVENTION

Exemplary embodiments are directed to providing a vehicle control apparatus and method for resetting an input steering angle sensor to maintain an angle overlay operation to the greatest extent possible even when an error has occurred in the input steering angle sensor while a vehicle performs the angle overlay operation.

According to an aspect of the present invention, there is provided a vehicle control apparatus for controlling an angle overlay operation of a vehicle, the vehicle control apparatus including a reception unit configured to receive a target steering angle from a target steering angle transmission apparatus, a resetting unit configured to reset an input steering angle sensor when an abnormality has occurred in the input steering angle sensor, and a control unit configured to control the angle overlay operation based on the target steering angle, whether an abnormality has occurred in the input steering angle sensor, and a steering angle received from the input steering angle sensor.

According to another aspect of the present invention, there is provided a vehicle control method for controlling an angle overlay operation of a vehicle, the vehicle control method including starting the angle overlay operation, resetting an input steering angle sensor when an abnormality has occurred in the input steering angle sensor, and controlling the angle overlay operation based on a target steering angle received from a target steering angle transmission apparatus, whether an abnormality has occurred in the input steering angle sensor, and a steering angle received from the input steering angle sensor.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
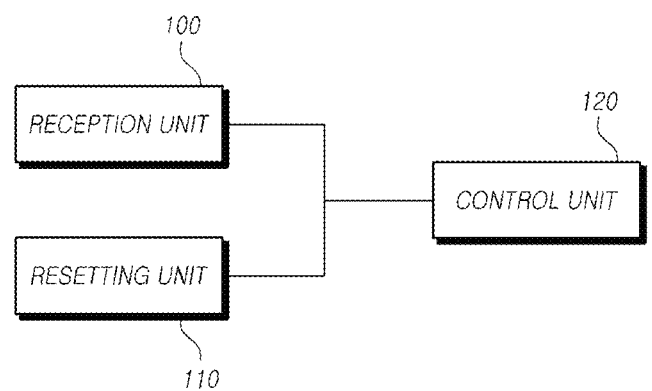
FIG. 1 is a diagram showing a configuration of a vehicle control apparatus according to an embodiment.

Hereinafter, some embodiments of the present disclosure will be described in detail with reference to the accompanying drawings. In adding reference numerals to elements in each figure, it should be noted that the same elements will be designated by the same reference numerals, if possible, although they are shown in different drawings. Further, in the following description of the present disclosure, a detailed description of known functions and configurations incorporated herein will be omitted when it is determined that the description may make the subject matter of the present invention rather unclear.

In addition, terms such as first, second, A, B, (a), (b) or the like may be used herein when describing components of the present disclosure. Each of these terminologies is not used to define an essence, order, sequence, or number of a corresponding component but used merely to distinguish the corresponding component from other component(s). It should be noted that if it is described in the specification that one component is "connected," "coupled" or "joined" to another component, the former may be directly "connected," "coupled" or "joined" to the latter or "connected," "coupled" or "joined" to the latter via another component.

Hereinafter, the present invention will be described in detail with reference to the accompanying drawings.

FIG. 1 is a diagram showing a configuration of a vehicle control apparatus according to an embodiment.

Referring to FIG. 1, the vehicle control apparatus may include a reception unit 100, a resetting unit 110, and a control unit 120.

The reception unit 100 may receive a target steering angle from a target steering angle transmission apparatus. The target steering angle transmission apparatus is configured to calculate a target steering angle of a vehicle on the basis of a state of the vehicle and an ambient environmental situation and deliver the target steering angle to the vehicle control apparatus.

A driving assist system (DAS) module mounted in a vehicle may be provided as an example of the target steering angle transmission apparatus. The DAS module may acquire front image information through a camera, analyze the front image information, and obtain information such as a lane, a preceding vehicle, or an obstacle's location. Also, the DAS module may calculate a target steering angle of the vehicle on the basis of the above-described information.

When an abnormality is detected from an input steering sensor, the resetting unit 110 may reset the input steering angle sensor.

The input steering angle sensor refers to a sensor for deriving a current steering angle of the vehicle. One of a plurality of sensors mounted in the vehicle may be used as the input steering angle sensor instead of adding a separate sensor to the vehicle as the input steering angle sensor.

However, when an abnormality has occurred in the relative steering angle sensor of the torque sensor during the angle overlay operation, the resetting unit 110 may reset the input steering angle sensor to be another sensor. This is because the vehicle's steering angle may be calculated using the other sensor even when an abnormality has occurred in the relative steering angle sensor of the torque sensor.

That is, the resetting unit 110 may designate a first steering angle sensor, a second steering angle sensor, and a third steering angle sensor as candidate sensors that may be used as the input steering angle sensor. By default, the first steering angle sensor is used as the input steering angle sensor. When an abnormality has occurred in the first steering angle sensor, the second steering angle sensor may be used as the input steering angle sensor. When an abnormality has occurred in both of the first steering angle sensor and the second steering angle sensor, the third steering angle sensor may be used as the input steering angle sensor.

In an embodiment, an example in which the first steering angle sensor is a relative steering angle sensor of a torque sensor will be described below.

First, when the angle overlay operation is started, the input steering angle sensor is set to be the relative steering angle sensor of the torque sensor.

However, when an abnormality has occurred in the relative steering angle sensor of the torque sensor during the angle overlay operation, the resetting unit 110 may reset the input steering angle sensor to be another sensor. This is because the vehicle's steering angle may be calculated using the other sensor even when an abnormality has occurred in the relative steering angle sensor of the torque sensor.

When an abnormality has occurred in the relative steering angle sensor of the torque sensor, the resetting unit 110 may attempt to reset the input steering angle sensor to be a motor position sensor. When an abnormality has also occurred in the motor position sensor, the resetting unit 110 may attempt to reset the input steering angle sensor to be an external angle sensor. The external angle sensor, which is a sensor capable of calculating an absolute steering angle of the vehicle, may be called an absolute steering angle sensor.

When an abnormality has also occurred in the external angle sensor, the resetting is not performed. Whether the above-described sensor has an abnormality may be checked through a fail-safe logic of a conventional vehicular sensor.

Advantageously, the external angle sensor may calculate the absolute steering angle of the vehicle by comparing the motor position sensor and the relative steering angle sensor of the torque sensor capable of calculating a relative angle based on a predetermined reference value.

However, since the external angle sensor delivers a signal value to the vehicle control apparatus through Controller Area Network (CAN) communication, the external angle sensor has a late update cycle and also has a lower measurement resolution than the motor position sensor and the relative steering angle sensor of the torque sensor. Accordingly, in this embodiment, the input steering angle sensor is set to be the external angle sensor only when an abnormality has occurred in both of the motor position sensor and the relative steering angle sensor of the torque sensor.

In another embodiment, an example will be described below in which the above-described first steering angle sensor is the motor position sensor.

First, when the angle overlay operation is started, the input steering angle sensor is set to be the motor position sensor.

However, when an abnormality has occurred in the motor position sensor during the angle overlay operation, the resetting unit 110 may reset the input steering angle sensor to be another sensor. This is because the vehicle's steering angle may be calculated using the other sensor even when an abnormality has occurred in the relative steering angle sensor of the torque sensor.

When an abnormality has occurred in the motor position sensor, the resetting unit 110 may attempt to reset the input steering angle sensor to be an external angle sensor.

When an abnormality has also occurred in the external angle sensor, the resetting unit 110 may attempt to reset the input steering angle sensor to be the relative steering angle sensor of the torque sensor.

When an abnormality has also occurred in the relative steering angle sensor of the torque sensor, the resetting is not performed. Whether the above-described sensor has an abnormality may be checked through a fail-safe logic of a conventional vehicular sensor.

In the above two examples, a time required for the resetting unit 110 to determine whether an abnormality has occurred in each sensor may be set to be less than a time required for the EPS to determine whether an abnormality had occurred in each sensor. That is, the resetting unit 110 may shorten the time required to determine the abnormality of each sensor so that the angle overlay operation can be quickly normalized and may quickly determine the abnormality of each sensor.

For example, it is assumed that the time required by the EPS to determine the abnormality of the motor position sensor is 35 ms, the time required to determine the abnormality of the external angle sensor is 200 ms, and the time required to determine the abnormality of the relative steering angle sensor of the torque sensor is 36 ms.

In this case, the resetting unit 110 may set the time required to determine the abnormality of the motor position sensor to 10 ms, which is less than 36 ms, may set the time required to determine the abnormality of the external angle sensor to 30 ms, which is shorter than 200 ms, and may set the time required to determine the abnormality of the relative steering angle sensor of the torque sensor to 10 ms, which is shorter than 36 ms.

The control unit 120 may control the angle overlay operation based on the target steering angle received from the reception unit 100, whether an abnormality had occurred in the input steering angle sensor set by the resetting unit 110, and the steering angle received from the input steering angle sensor.

When one or more of the above-described sensors operate normally, the current steering angle of the vehicle may be normally calculated by means of the input steering angle sensor. Accordingly, the control unit 120 may receive the steering angle from the input steering angle sensor and enable the steering angle of the vehicle to follow the target steering angle. That is, the control unit 120 may perform control to maintain the angle overlay operation.

However, when all of the above-described three sensors detect an abnormality, the input steering angle sensor also operates abnormally. Accordingly, when the abnormality of the input steering angle sensor is detected, the control unit 120 may perform control to stop the angle overlay operation. When the angle overlay operation is stopped, autonomous driving is terminated, and thus a driver must directly control the steering of the vehicle.

Figure 2:
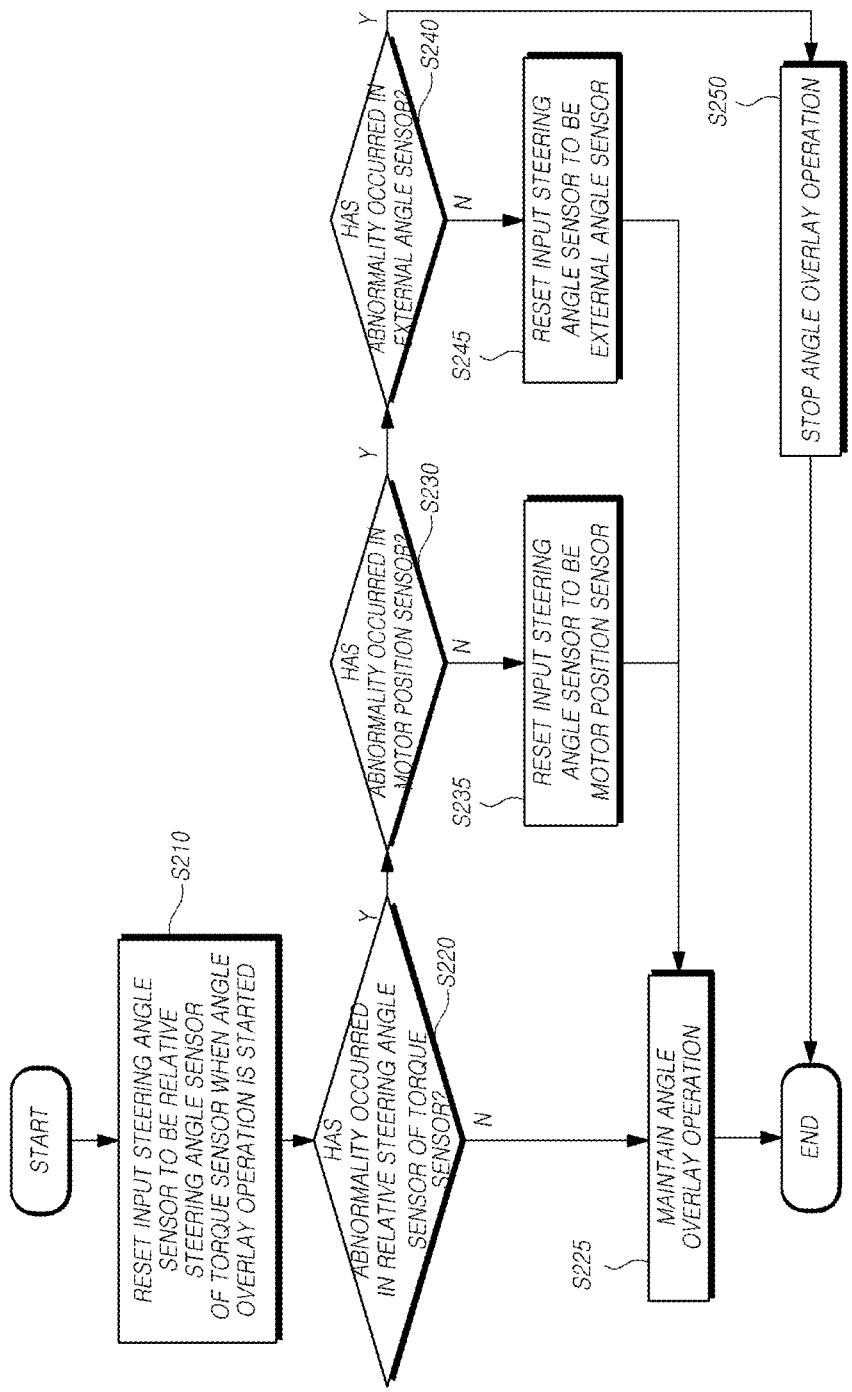
FIG. 2 is a flowchart showing operation of a vehicle control apparatus according to an embodiment.

FIG. 2 is a flowchart showing operation of a vehicle control apparatus according to an embodiment.

The following description shows an example in which operations are performed by the vehicle control apparatus shown in FIG. 1. In detail, among the examples shown in FIG. 1, an example in which the relative steering angle sensor of the torque sensor is used as the input steering angle sensor when the angle overlay operation is initially started will be described below.

Referring to FIG. 2, the vehicle control apparatus may set the input steering angle sensor to be the relative steering angle sensor of the torque sensor when the angle overlay operation is first started (S210).

After step S210, the vehicle control apparatus checks which one of the above-described three sensors may be set as the input steering angle sensor in order to perform the angle overlay operation.

First, the vehicle control apparatus determines whether an abnormality has occurred in the relative steering angle sensor of the torque sensor (S220). In step S210, the input steering angle sensor is set to be the relative steering angle sensor of the torque sensor when the angle overlay operation is first started. Accordingly, when no abnormality had occurred in the relative steering angle sensor of the torque sensor (S220-N), the input steering angle sensor operates normally, and thus the vehicle control apparatus may perform control to maintain the angle overlay operation (S225).

When an abnormality has occurred in the relative steering angle sensor of the torque sensor (S220-Y), the vehicle control apparatus determines whether an abnormality has occurred in the motor position sensor (S230). When the motor position sensor operates normally (S230-N), the steering angle of the vehicle may be calculated by means of the motor position sensor. Accordingly, the resetting unit 110 of the vehicle control apparatus may reset the input steering angle sensor to be the motor position sensor (S235). Also, the vehicle control apparatus may perform control to maintain the angle overlay operation (S225).

When an abnormality has occurred in the motor position sensor (S230-Y), the vehicle control apparatus determines whether an abnormality has occurred in the external angle sensor (S240). When the external angle sensor operates normally (S230-N), the steering angle of the vehicle may be calculated by means of the external angle sensor. Accordingly, the resetting unit 110 of the vehicle control apparatus may reset the input steering angle sensor to be the external angle sensor (S245). Also, the vehicle control apparatus may perform control to maintain the angle overlay operation (S225).

When an abnormality has also occurred in the external angle sensor (S240-N), there is no sensor to deliver a signal value for calculating the steering angle of the vehicle. Accordingly, the vehicle control apparatus may determine to no longer perform the angle overlay operation and may stop the angle overlay operation (S250).

Figure 3:
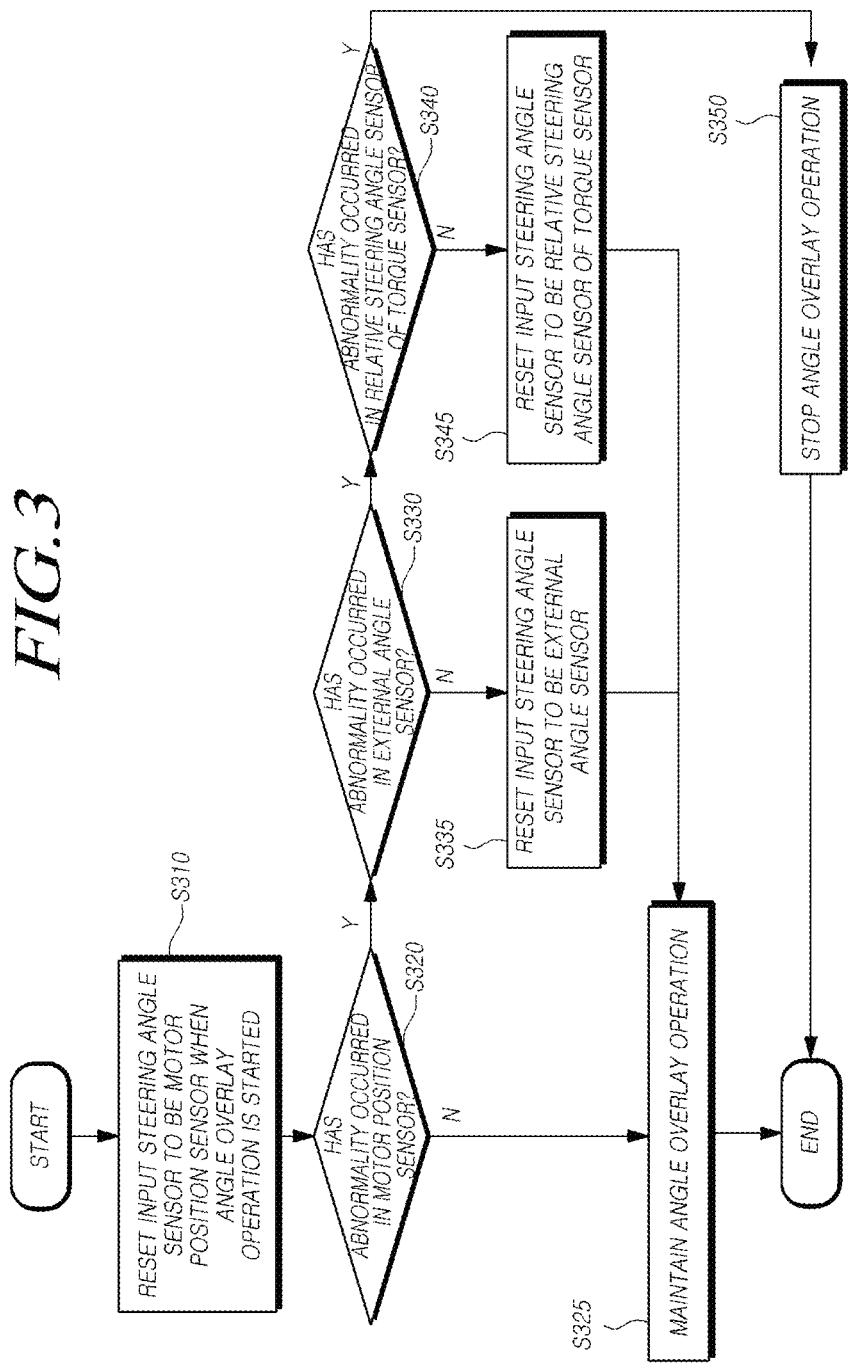
FIG. 3 is a flowchart showing operation of a vehicle control apparatus according to another embodiment.

FIG. 3 is a flowchart showing operation of a vehicle control apparatus according to another embodiment.

The following description shows an example in which operations are performed by the vehicle control apparatus shown in FIG. 1. In detail, among the examples shown in FIG. 1, an example in which the motor position sensor is used as the input steering angle sensor when the angle overlay operation is first operated will be described below.

Referring to FIG. 3, the vehicle control apparatus may set the input steering angle sensor to be the motor position sensor when the angle overlay operation is first started (S310).

After step S310, the vehicle control apparatus checks which one of the above-described three sensors may be set as the input steering angle sensor in order to perform the angle overlay operation.

First, the vehicle control apparatus determines whether an abnormality has occurred in the motor position sensor (S320). In step S210, the input steering angle sensor is set to be the motor position sensor when the angle overlay operation is first started. Accordingly, when no abnormality has occurred in the motor position sensor (S320-N), the input steering angle sensor operates normally, and thus the vehicle control apparatus may perform control to maintain the angle overlay operation (S325).

When an abnormality has occurred in the motor position sensor (S320-Y), the vehicle control apparatus determines whether an abnormality has occurred in the external angle sensor (S330). When the external angle sensor operates normally (S330-N), the steering angle of the vehicle may be calculated by means of the external angle sensor. Accordingly, the resetting unit 110 of the vehicle control apparatus may set the input steering angle sensor to be the external angle sensor (S335). Also, the vehicle control apparatus may perform control to maintain the angle overlay operation (S325).

When an abnormality has also occurred in the external angle sensor (S330-Y), the vehicle control apparatus determines whether an abnormality has occurred in the relative steering angle sensor of the torque sensor (S340). When the relative steering angle sensor of the torque sensor operates normally (S340-N), the steering angle of the vehicle may be calculated by means of the relative steering angle of the torque sensor. Accordingly, the resetting unit 110 of the vehicle control apparatus may reset the input steering angle sensor to be the relative steering angle sensor of the torque sensor (S345). Also, the vehicle control apparatus may perform control to maintain the angle overlay operation (S325).

Figure 4:
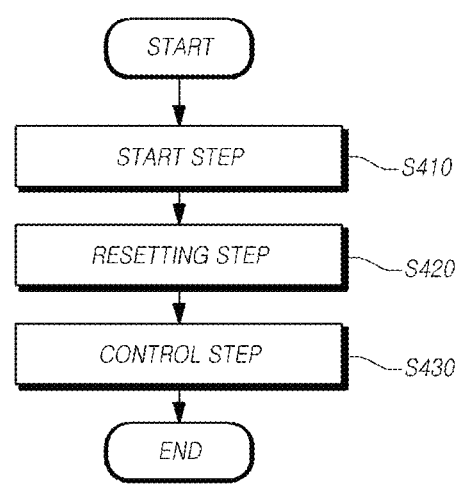
FIG. 4 is a flowchart showing a vehicle control method according to an embodiment.

When an abnormality has also occurred in the relative steering angle sensor of the torque sensor (S340-N), there is no sensor to deliver a signal value for calculating the steering angle of the vehicle. Accordingly, the vehicle control apparatus may determine to no longer perform the angle overlay operation and may stop the angle overlay operation (S250). FIG. 4 is a flowchart showing a vehicle control method according to an embodiment.

Referring to FIG. 4, the vehicle control method may include a start step in which the angle overlay operation is started (S410).

In the start step, as an example, the input steering angle sensor may be set to be the relative steering angle sensor of the torque sensor.

Also, the vehicle control method may include a resetting step in which the input steering angle sensor is reset when an abnormality has occurred in the input steering angle sensor.

In the resetting step, as an example, the input steering angle sensor may be set to be the motor position sensor when an abnormality has occurred in the relative steering angle sensor of the torque sensor and the motor position sensor operates normally, as described above with reference to FIGS. 1 and 2.

In the resetting step, the input steering angle sensor may be set to be the external angle sensor when an abnormality has occurred in the motor position sensor and the relative steering angle sensor of the torque sensor and the external angle sensor operates normally.

When an abnormality has occurred even in the external angle sensor, the resetting is not performed.

Also, the vehicle control method may include a control step in which the angle overlay operation is controlled based on a target steering angle received from a target steering angle transmission apparatus, whether an abnormality has occurred in the input steering angle sensor, and a steering angle received from the input steering angle sensor (S430).

In the control step, the angle overlay operation may be maintained while the input steering angle sensor operates normally so that the steering angle of the vehicle may be received from the input steering angle sensor, and the angle overlay operation may be stopped when an abnormality has occurred in the input steering angle sensor.

According to the present invention, it is possible for an autonomous driving vehicle to maintain an angle overlay operation as much as possible even when an abnormality has occurred in a relative steering angle sensor of a torque sensor while the vehicle is performing the angle overlay operation.

Even though all of the elements of the above-described embodiments of the present invention have been described as combining into a single component or operating in combination, the invention is not necessarily limited to these embodiments. In other words, within the scope of the invention, all the elements may selectively combine into one or more elements to operate.

The above description is only illustrative of the technical idea of the present invention, and those skilled in the art will appreciate that various modifications, additions and substitutions are possible without departing from the essential characteristics of the invention. Therefore, the embodiments disclosed herein are intended not to limit but to describe the technical spirit of the present invention, and the scope of the present invention is not limited to the embodiments. The scope of the invention should be construed by the appended claims, and all technical sprits within the scope of their equivalents should be construed as included in the scope of the invention.

What is claimed is:

1. A vehicle control apparatus for controlling an angle overlay operation of a vehicle, the vehicle control apparatus comprising:

a reception unit configured to receive a target steering angle from a target steering angle transmission apparatus;

a resetting unit configured to reset an input steering angle sensor when an abnormality has occurred in the input steering angle sensor, wherein one of a plurality of sensors is set as the input steering angle sensor for deriving a current steering angle and the resetting unit changes the input steering angle sensor from a current input steering angle sensor having the abnormality to another sensor normally operated among the plurality of the sensors to reset the input steering angle sensor; and a control unit configured to control the angle overlay operation based on the target steering angle and the current steering angle derived from the input steering angle sensor.

2. The vehicle control apparatus of claim 1, wherein the input steering angle sensor is set to be a relative steering angle sensor of a torque sensor when the angle overlay operation is started.

3. The vehicle control apparatus of claim 1, wherein the resetting unit resets the input steering angle sensor to be a motor position sensor when an abnormality has occurred in a relative steering angle sensor of a torque sensor and the motor position sensor operates normally.

4. The vehicle control apparatus of claim 1, wherein the resetting unit resets the input steering angle sensor to be an external angle sensor when an abnormality has occurred in a relative steering angle sensor of a torque sensor and a motor position sensor and the external angle sensor operates normally.

5. The vehicle control apparatus of claim 1, wherein the input steering angle sensor is set to be a motor position sensor when the angle overlay operation is started.

6. The vehicle control apparatus of claim 1, wherein the resetting unit resets the input steering angle sensor to be an external angle sensor when an abnormality has occurred in a motor position sensor and the external angle sensor operates normally.

7. The vehicle control apparatus of claim 1, wherein the resetting unit resets the input steering angle sensor to be a relative steering angle sensor of a torque sensor when an abnormality has occurred in a motor position sensor and an external angle sensor and the relative steering angle sensor of the torque sensor operates normally.

8. The vehicle control apparatus of claim 1, wherein the resetting unit is configured to initially set a relative steering angle sensor as the input steering angle sensor, reset the input steering angle sensor by changing the input steering angle sensor from the relative steering angle sensor to a motor position sensor when the relative steering angle sensor has an abnormality, and reset the input steering angle sensor by changing the input steering angle sensor from the motor position sensor to an external angle sensor configured to calculate an absolute steering angle when the motor position sensor has an abnormality.

9. The vehicle control apparatus of claim 1, wherein the resetting unit is configured to initially set a motor position sensor as the input steering angle sensor, reset the input steering angle sensor by changing the input steering angle sensor from the motor position sensor to an external angle sensor configured to calculate an absolute steering angle when the motor position sensor has an abnormality, and reset the input steering angle sensor by changing the input steering angle sensor from the external angle sensor to a relative steering angle sensor when the external angle sensor has an abnormality.

10. The vehicle control apparatus of claim 1, wherein a time required for the resetting unit to determine whether the abnormality has occurred in the input steering angle sensor is set to be less than a time required for an electric power steering to determine whether the abnormality has occurred in the input steering angle sensor.

11. A vehicle control method for controlling an angle overlay operation of a vehicle, the vehicle control method comprising:
  starting the angle overlay operation;
  resetting an input steering angle sensor when an abnormality has occurred in the input steering angle sensor, wherein one of a plurality of sensors is set as the input steering angle sensor for deriving a current steering angle and the resetting of the input steering angle sensor comprises changing the input steering angle sensor from a current input steering angle sensor having the abnormality to another sensor normally operated among the plurality of the sensors to reset the input steering angle sensor; and
  controlling the angle overlay operation based on a target steering angle received from a target steering angle transmission apparatus and the current steering angle received from the input steering angle sensor.

12. The vehicle control method of claim 11, wherein the starting of the angle overlay operation comprises resetting the input steering angle sensor to be a relative steering angle sensor of a torque sensor.

13. The vehicle control method of claim 11, wherein the resetting of the input steering angle sensor comprises resetting the input steering angle sensor to be a motor position sensor when an abnormality has occurred in the relative steering angle sensor of the torque sensor and the motor position sensor operates normally.

14. The vehicle control method of claim 11, wherein the resetting of the input steering angle sensor comprises resetting the input steering angle sensor to be an external angle sensor when an abnormality has occurred in a relative steering angle sensor of a torque sensor and a motor position sensor and the external angle sensor operates normally.

15. The vehicle control method of claim 11, wherein the starting of the angle overlay operation comprises resetting the input steering angle sensor to be a motor position sensor.

16. The vehicle control method of claim 11, wherein the resetting of the input steering angle sensor comprises resetting the input steering angle sensor to be an external angle sensor when an abnormality has occurred in a motor position sensor and the external angle sensor operates normally.

17. The vehicle control method apparatus of claim 11, wherein the resetting of the input steering angle sensor comprises resetting the input steering angle sensor to be a relative steering angle sensor of a torque sensor when an abnormality has occurred in a motor position sensor and an external angle sensor and the relative steering angle sensor of the torque sensor operates normally.

18. The vehicle control method of claim 11, further comprising initially setting a relative steering angle sensor as the input steering angle sensor, wherein the resetting of the input steering angle sensor comprises:
  resetting the input steering angle sensor by changing the input steering angle sensor from the relative steering angle sensor to a motor position sensor when the relative steering angle sensor has an abnormality; and
  resetting the input steering angle sensor by changing the input steering angle sensor from the motor position sensor to an external angle sensor configured to calculate an absolute steering angle when the motor position sensor has an abnormality.

19. The vehicle control method of claim 11, further comprising initially setting a motor position sensor as the input steering angle sensor, wherein the resetting of the input steering angle sensor comprises:
  resetting the input steering angle sensor by changing the input steering angle sensor from the motor position sensor to an external angle sensor configured to calculate an absolute steering angle when the motor position sensor has an abnormality; and
  resetting the input steering angle sensor by changing the input steering angle sensor from the external angle sensor to a relative steering angle sensor when the external angle sensor has an abnormality.

20. The vehicle control method of claim 11, wherein a time required for the resetting of the input steering angle sensor to determine whether the abnormality has occurred in the input steering angle sensor is set to be less than a time required for an electric power steering to determine whether the abnormality has occurred in the input steering angle sensor.

* * * * *